United States Patent [19]
Kanao et al.

[11] Patent Number: 5,799,703
[45] Date of Patent: Sep. 1, 1998

[54] SYNTHETIC RESIN CORRUGATED PIPE HAVING A CONCAVE-CONVEX SURFACE

[76] Inventors: Shiro Kanao, deceased, late of Osaka; by Chizuko Kanao, heir, 9-18, Nanpeidai 4-chome, Takatsuki-shi, Osaka; by Shigeki Kanao, heir, 2-40, Minami-machi, Jurinji, Nishinomiya-shi, Osaka, all of Japan

[21] Appl. No.: 600,595

[22] Filed: Feb. 13, 1996

[30] Foreign Application Priority Data

Feb. 14, 1995 [JP] Japan ................... 7-050602

[51] Int. Cl.$^6$ ................................................. F16L 11/00
[52] U.S. Cl. ..................... 138/121; 138/122; 138/177; 138/115; 138/155; 285/367
[58] Field of Search .......................... 138/121, 122, 138/120, 155, 177, 111, 114, 115, 116, 117

[56] References Cited

U.S. PATENT DOCUMENTS

| 2,146,352 | 2/1939 | Rohrer ........................... 138/155 X |
| 2,206,286 | 7/1940 | Karmazin ........................ 138/155 X |
| 2,563,578 | 8/1951 | Candee . |
| 3,693,664 | 9/1972 | Schmunk ........................ 138/155 X |
| 4,275,771 | 6/1981 | Campbell, Jr. .................. 138/155 X |
| 4,560,320 | 12/1985 | Baus ............................. 138/155 X |
| 4,662,734 | 5/1987 | Nishi ............................. 138/121 |
| 4,790,975 | 12/1988 | Jarvenkyla et al. ............. 138/121 X |
| 5,120,083 | 6/1992 | Stine . |
| 5,429,397 | 7/1995 | Kano ............................. 138/121 X |

FOREIGN PATENT DOCUMENTS

| 2386767 | 4/1978 | France . |
| 432158 | 9/1967 | Switzerland . |

*Primary Examiner*—Patrick F. Brinson
*Attorney, Agent, or Firm*—Whitham, Curtis & Whitham

[57] ABSTRACT

A synthetic resin corrugated pipe includes a pipe wall having an annularly- or helically-shaped convex-concave surface. The convex-concave surface has a plurality of convex portions having a quadrangular cross-sectional shape and a plurality of concave portions having a circular cross-sectional shape.

25 Claims, 8 Drawing Sheets

SYNTHETIC RESIN CORRUGATED PIPE HAVING A CONCAVE-CONVEX SURFACE

BACKGROUND OF THE INVENTION

1. Field of the Invention

The present invention generally relates to a synthetic resin corrugated pipe which is suitable for indoor/outdoor use and for either above ground or underground use. More specifically, the invention relates to a pipe used for protecting electric wiring, optical fiber cables, electric power cabling and similar linear structures. Further, the invention relates to multi-pipe lines that include parallel, bundled pipes.

2. Description of the Related Art

A first conventional synthetic resin corrugated pipe contains a pipe wall having an annular- or helical-shaped convex-concave surface. Such a shape improves the strength of the pipe and keeps the pipe from being flattened. The above synthetic resin corrugated pipe is used to protect electric wires, to feed water, and the like. In one configuration, a bundle of pipes is provided as a "C.C. BOX", which is a multipurpose duct that houses underground electric wires, optical fiber cables, electric power cables, or the like.

Another conventional synthetic resin corrugated pipe has a pipe wall with a convex-concave surface in which the concave portions and convex portions are both circular. Alternatively, a rectangular pipe with a convex-concave surface includes a rectangular concave portion and a rectangular convex portions.

It is difficult to maintain a bundle of circular pipes parallel because the positional stability of the circular pipes is poor, especially when such circular pipes are bundled in parallel, to form a multi-pipe line used underground because dirt and sand enter between the circular pipes and disturb the linear alignment of the individual circular pipes. Accordingly a cable or wire may "zig-zag" when inserted into the pipe. This problem increases wiring resistance and makes it difficult to maintain the bundle posture.

Conventional rectangular pipes have flat sides which fit against one another and prevent dirt and sand from entering between the individual pipes of a multi-pipe bundle. However, when a wire or cable is inserted into the rectangular pipe, the wire or cable typically moves toward a corner portion of the pipe, particularly in a curved portion of the rectangular pipe. Accordingly, the rectangular pipe has a high wiring resistance and it is difficult to insert multiple cables therein. Therefore, a rectangular pipe is generally not used to carry or protect cables or lines.

SUMMARY OF THE INVENTION

An object of the present invention is to overcome the aforementioned problems of conventional circular or rectangular pipes.

Another object of the present invention is to provide a synthetic resin corrugated pipe having a special structure designed to solve the problems of the conventional pipe.

A third object of the present invention is to produce a pipe as easily as the conventional pipe, but without increased cost and the pipe is designed to have the same strength against being flattened by pressure as the conventional pipe, even though the pipe is formed only from synthetic resin.

More specifically, the synthetic resin corrugated pipe according to the present invention is configured so that the pipe wall is shaped to have an annular or helical convex-concave surface. Each convex portion of the convex-concave surface has a quadrangular cross-sectional shape. Each concave portion of the convex-concave surface is shaped to have a circular cross-sectional shape.

Since each of the convex portions has a quadrangular shape, the pipe can be laid flat stably and positioned easily. The flat surface of the pipe prevents the pipe from being displaced after positioning thereof. The ribs of the circular concave portions project into the pipe and support the cable and allow the cable to be inserted into the pipe with minimum resistance.

The present invention further includes a structure in which a quadrangular fitting pipe portion has an internal size and shape substantially equal to the external size and shape of the convex portions which allows the pipes to be joined easily. The fitting pipe portion is formed integrally on one end of the pipe and an insertion connection portion is formed on the other end of the pipe. The fitting pipe portion and the insertion connection portion are fitted together to join the pipes. The insertion connection portion has a special concave portion with a size and shape corresponding to those of the convex portions. The fitting portion and the insertion portion may be cylindrical.

Furthermore, when multiple pipes are arranged in a parallel, bundled to form a multi-pipe line, the parallel alignment of the individual pipes is easily maintained because of the flat surfaces of the convex portions. The foregoing structure prevents a large amount of dirt, sand and other contaminants from entering between the individual pipes. Thus, the pipe according to the present invention is highly suitable for underground piping.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF THE PREFERRED EMBODIMENTS OF THE INVENTION

Figure 1:
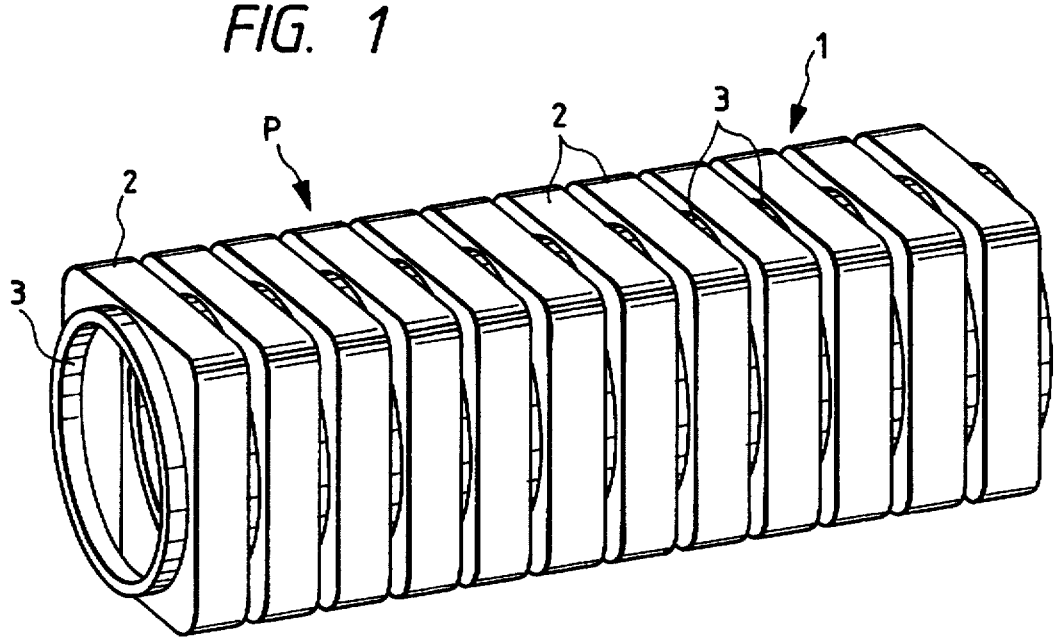
FIG. 1 is a perspective view of a pipe showing a first embodiment of the present invention.

Hereinbelow and referring to the attached drawings, preferred embodiments of the present invention will be described. For clarity and ease of understanding, like elements have the same reference numerals throughout the drawings.

Figure 2:
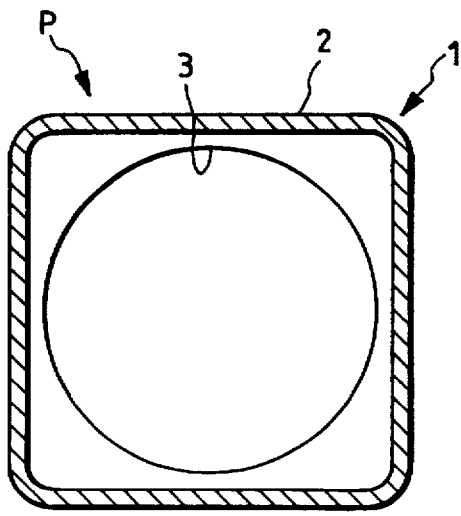
FIG. 2 is a longitudinal sectional view of a convex portion of the pipe according to the present invention.
Figure 3:
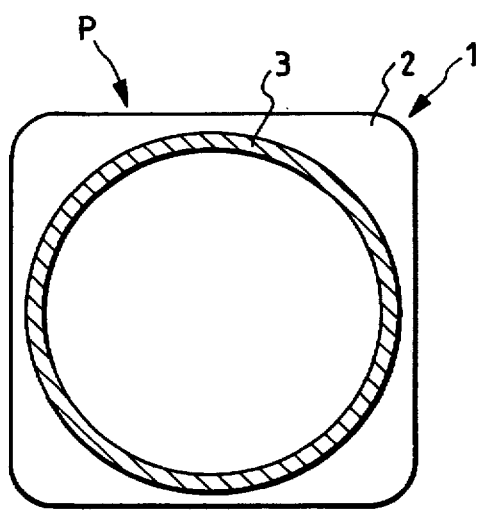
FIG. 3 is a longitudinal sectional view of a concave portion of the pipe according to the present invention.

Referring to FIGS. 1–3, a pipe P according to a first embodiment of the present invention has a pipe wall 1 which has an annular, convex-concave corrugated surface. The convex portions 2 of the convex-concave corrugated surface each have an internal and external square cross-sectional shape with rounded (i.e., arc-shaped) corner portions. Concave portions 3 of the convex-concave corrugated surface each have an internal and external circular cross-sectional shape.

The concave portions 2 and convex portions 3 are alternately disposed along the axis of the pipe. However, the convex-concave corrugated surface of the pipe wall 1 is not limited to such an annular convex-concave corrugated surface, but also may be provided as a helical convex-concave corrugated surface or other similar shape. Moreover, the cross-sectional shape of each of the convex portions 2 described herein is not limited to a square shape, but may be a rectangular shape elongated transversely or longitudinally.

As known by the ordinarily skilled artisan taking the present application as a whole, the pipes P having the aforementioned structure can be formed by many methods, including extruding melted resin into a known caterpillar-type, pipe-forming consecutive mold from a resin extruder to form a tube. Generally, high-pressure air is blown into the tube or air is sucked from the mold simultaneously, whereby the melted tube is pressed against the mold to continuously form the pipes P. The synthetic resin material for forming the pipe wall 1 of the pipe P of the present invention can include, polyethylene, polyvinyl chloride, polypropylene and/or any other suitable synthetic resin material. The pipe P is preferably formed solely from synthetic resin.

Figure 4:
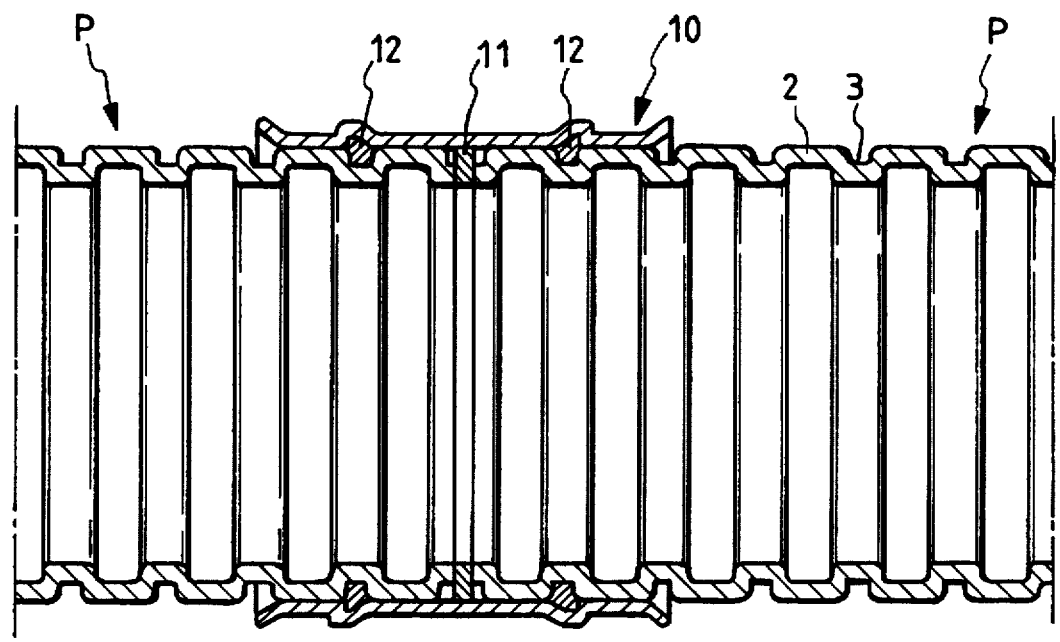
FIG. 4 is a transverse sectional view of a connection portion of the pipe according to the present invention.
Figure 5:
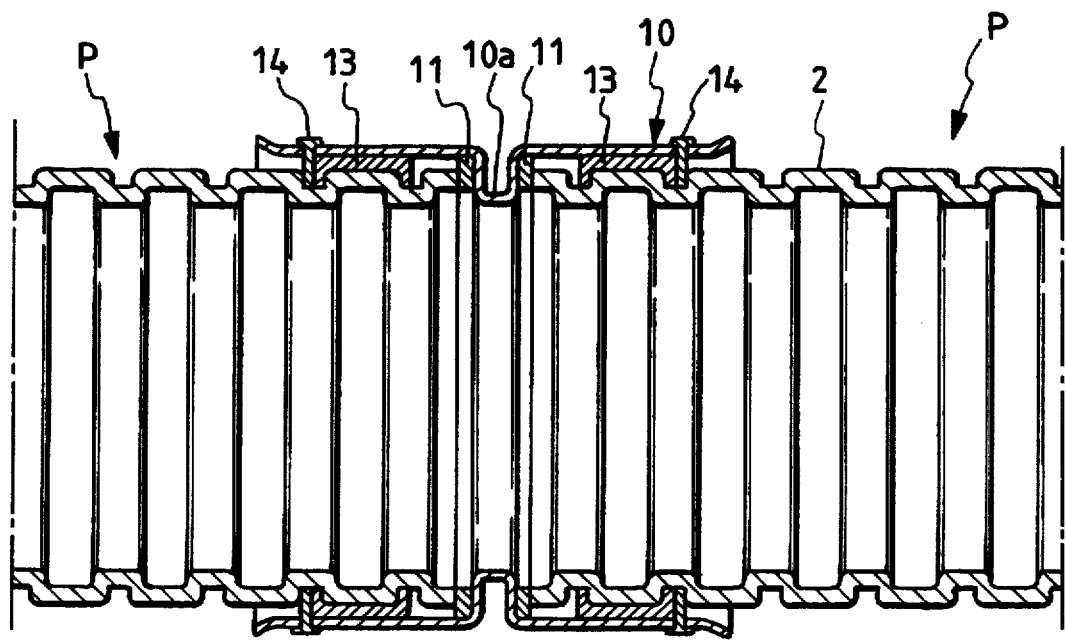
FIG. 5 is a transverse sectional view showing a modified example of the embodiment of the connection portion of the pipe shown in FIG. 4.

FIGS. 4 and 5 respectively show first and second joints for connecting the pipes P. In the connection joints shown in FIG. 4, square ring-shaped packings 12 each have a circular cavity of a size substantially equal to that of the concave portion 3 and a square external circumference, size and shape analogous to the circumference, size and shape of the convex portions 2, but larger than the external size and shape of the convex portions 2.

When joining first and second pipes P, the ring-shaped packings 12 are fitted onto the end portions of the first and second pipes P and then the first and second pipes P are pressed into a rectangular pipe-shaped joint 10 from opposite sides. The pipe-shaped joint 10 has recesses for accommodating the packings 12. Another ring-like packing 11 is interposed between the end surfaces of the first and second pipes P to seal the pipes.

In the connection joint shown in FIG. 5, square ring-shaped packings 13 each have a channel-shaped cross-section. To form the joint, the packings 13 are fitted onto the convex portions 2 located near the end portions of first and second pipes P. The first and second pipes P are pressed into a rectangular pipe-like joint 10. Other ring-shaped packings 11 are interposed between opposite sides of an intermediate re-entrant groove 10a of the joint 10. The re-entrant groove 10a is a groove which presses the packings 11 against the ends of the pipes P. Further, motion stop pins 14 are fitted onto the outer circumference of the joint for securing the joint and ensuring the pipes are reliably coupled together.

Figure 6:
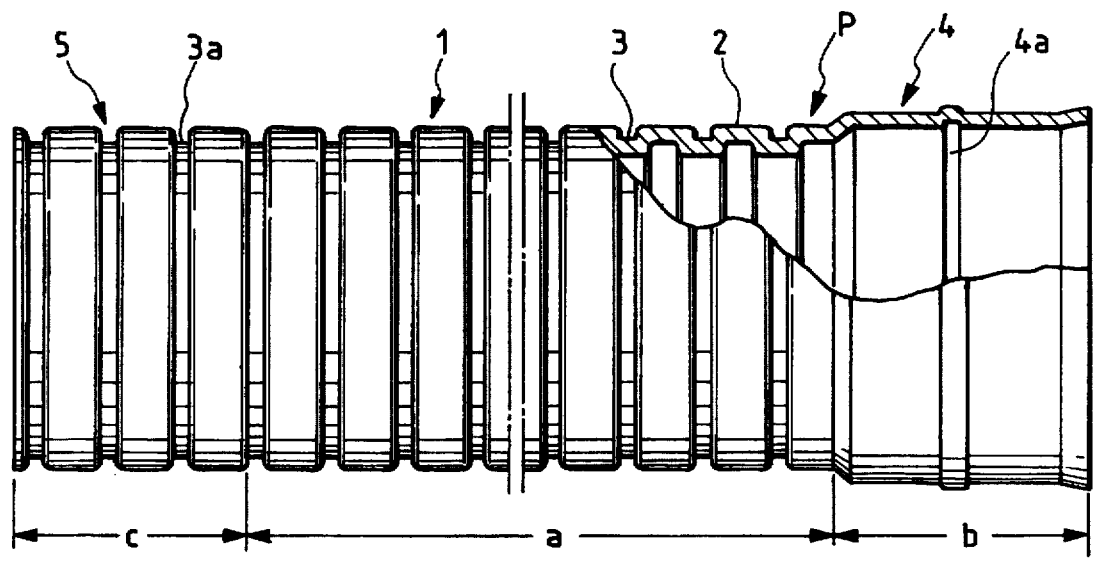
FIG. 6 is a partially-cut away front view of a pipe according to a second embodiment of the present invention.
Figure 7:
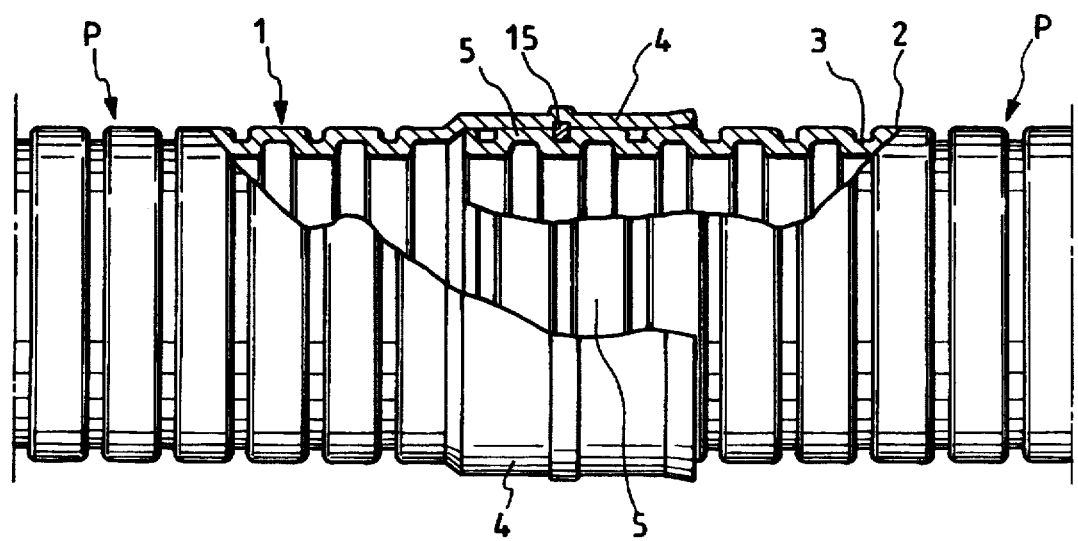
FIG. 7 is a partially cut-away front view of a connection portion of the pipe according to the second embodiment of the present invention.

A second embodiment is shown in FIGS. 6 and 7. A difference between the first and second embodiments is that the second embodiment has a quadrangular-section fitting pipe-shaped portion 4 which has an internal size and shape substantially equal to those of a convex portion 2. Further, a re-entrant groove 4a is continuously and integrally formed on one end side b (e.g., the right end side in FIG. 6) of a pipe P. An insertion connection portion 5 has a special concave portion 3a continuously and integrally formed on a second end side c (e.g., a left side in FIG. 6) of the pipe P.

To connect pipes P, as shown in FIG. 7, a rectangular-section O-ring 15 is fitted into the special concave portion 3a. The outer circumferential portion of the O-ring 15 projects over the convex portions 2. To form the joint, the pipe section c is pressed into the rectangular fitting pipe-like portion 4 so that the outward projecting portion of the O-ring 15 fits into the re-entrant groove 4a.

Although the embodiment shown in FIG. 6 has an insertion connection portion 5 which has a concave portion and a special concave portion 3a, the insertion connection portion 5 is not always needed. That is, as a modified example of this second embodiment, the pipe has only a quadrangular fitting pipe-like portion 4 formed on one end side b of the pipe.

To connect pipes with such a configuration, the pipe should be cut, such as along line a. Then, the cut end portion of the pipe body portion a can be connected to the portion 4 in the same manner as shown in FIG. 7, or the cut end portions can be connected using the joint 10 illustrated in FIGS. 4 and 5. The structure illustrated in FIGS. 6 and 7 is advantageous since the pipe body portion can be cut into a desired length at an arbitrary point and easily joined to the next section of pipe.

Figure 8:
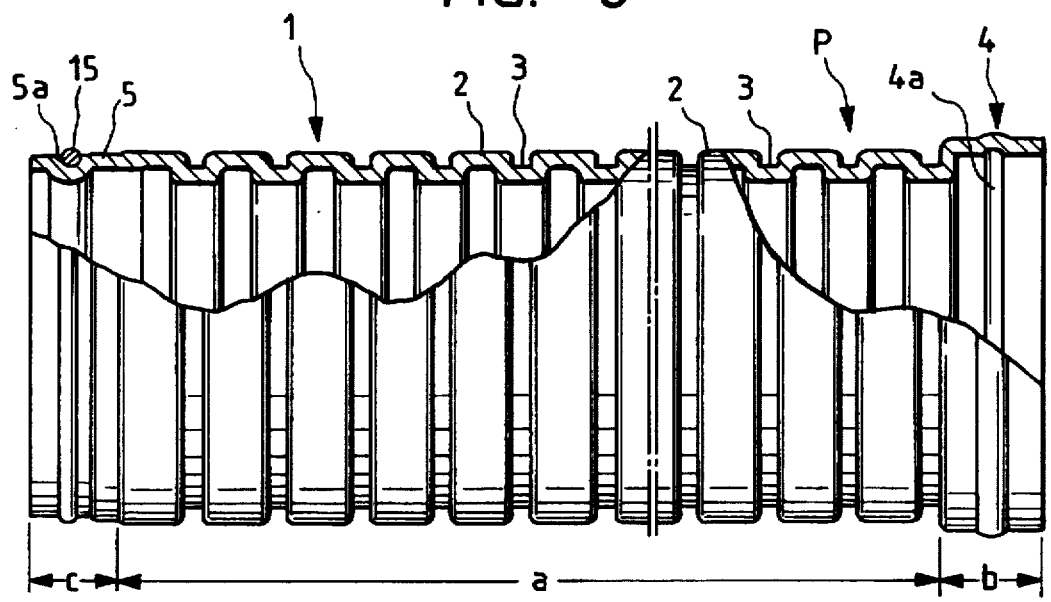
FIG. 8 is a partially cut-away front view of a pipe according to a third embodiment of the present invention.
Figure 9:
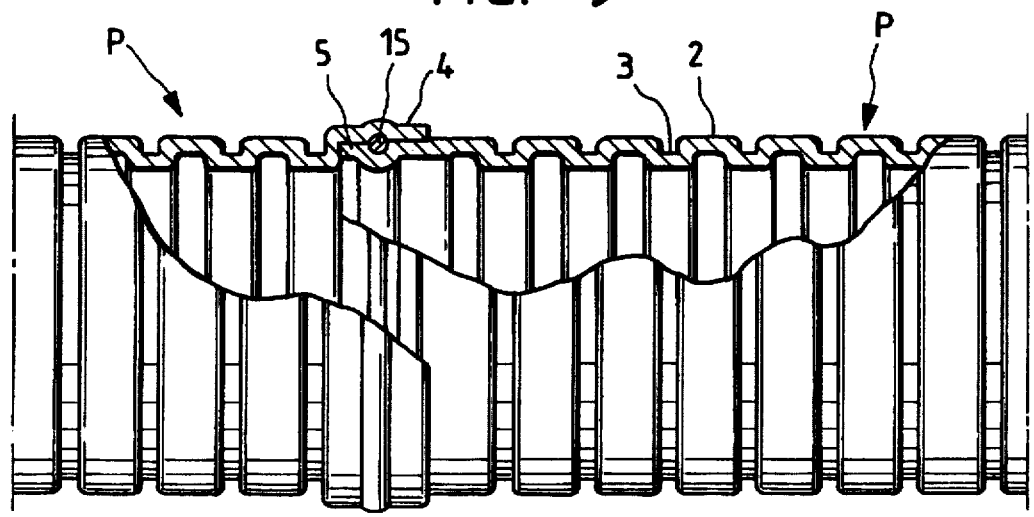
FIG. 9 is a partially cut-away front view of a connection portion of the pipe according to the present invention.

A third embodiment of the present invention is illustrated in FIGS. 8 and 9 and differs from the second embodiment by the fitting pipe-like portion 4 formed on one end side b (the right side in FIG. 8) being cylindrical and a semicircular re-entrant groove 4a being formed along the inner surface of the portion 4. The male side connection portion 5 on a second end c (e.g., left side in FIG. 8) is shaped like a cylinder and a semicircular re-entrant groove 5a is formed in the outer circumferential surface of the portion 5. A circular-section O-ring 15 is fitted into the groove 5a. The inner circumferential surface of the re-entrant groove 5a has a diameter substantially equal to that of the inner circumferential surface of the concave portion 3.

To connect pipes P having the configuration shown in FIGS. 8 and 9, the circular section O-ring 15 is fitted into the re-entrant groove 5a in the cylindrical insertion connection portion 5 of a first pipe P. The outer circumferential portion of the O-ring projects over the outer circumferential surface. The cylindrical insertion connection portion 5 is pressed into the cylindrical fitting pipe-like portion 4 in a second pipe P and the outward projecting portion of the O-ring 15 fits into the re-entrant groove 4a, to thereby connect the pipes.

Figure 10:
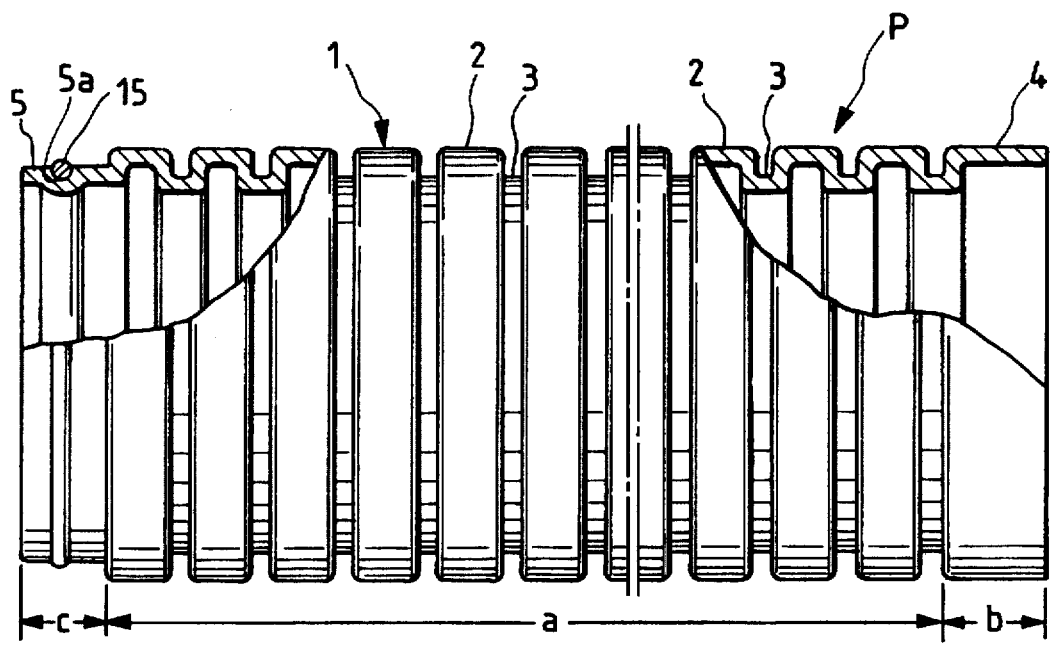
FIG. 10 is a partially cut-away front view of a pipe according to a modified example of the embodiment shown in FIG. 8.
Figure 11:
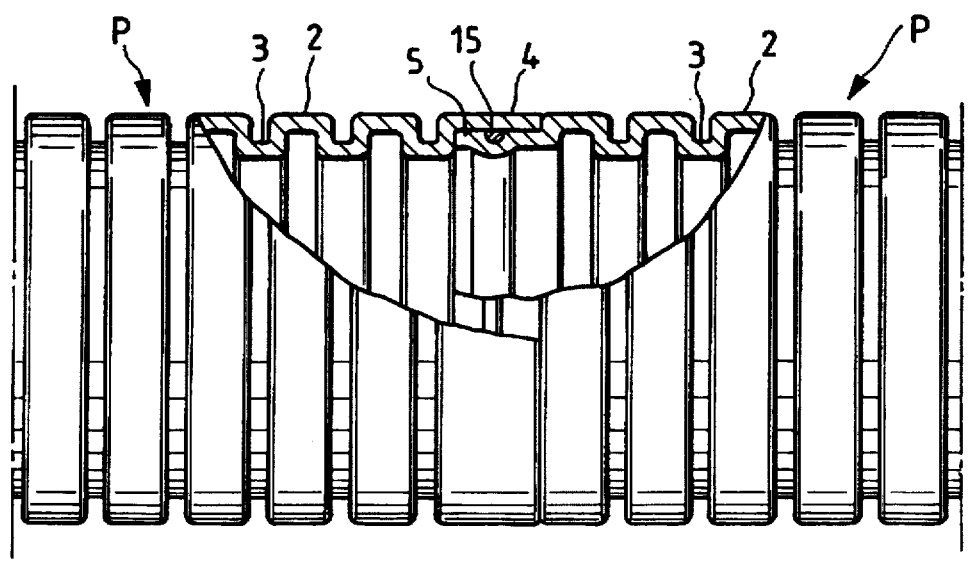
FIG. 11 is a partially cut-away front view of a connection portion of the pipe according to the present invention.

FIGS. 10 and 11 show a modified example of the third embodiment of the present invention, in which the diameter of the outer circumference of the cylindrical-section fitting pipe-shaped portion 4 on the right end side b is substantially equal to that of the outer surface of the quadrangular convex portion 2. The diameter of the inner circumference of the cylindrical-section insertion connection portion 5 located on the left end side c is shaped so as to be inserted in the fitting pipe-like portion 4. The diameter of the inner circumference of the portion where the re-entrant groove 5a is formed for fitting the O-ring 15 is substantially equal to that of the inner circumference of the circular concave portion 3 in the pipe body portion.

The outer circumferential surface of the fitting pipe-like portion 4 is shaped so as not to project over the outer circumference of the pipe body portion a. This structure allows a plurality of pipes to be aligned, without increasing the size of the connection portion between the pipes and is especially useful when a multi-pipe line is formed. If the inner surface of the insertion connection portion 5 is shaped in the same manner as illustrated in FIGS. 10 and 11, a cable can be inserted with minimum resistance and effort. As easily understood by the ordinarily skilled artisan within the purview of the present application, the above feature can be applied to the structure of the connection portion in any of the other embodiments described herein.

The fitting portion 4 illustrated in FIGS. 10 and 11 has a flat pipe-shape having an inner circumferential surface in which no re-entrant groove 4a is formed. Depending upon the specific application, re-entrant grooves 4a and 5a need not always be provided in two fitting surfaces. In some applications, a re-entrant groove 4a need be formed only in either one of the two fitting surfaces. Alternatively, a groove need not be formed in either surface. Further, the sealing means is not limited to the O-ring 15, but can include other similar structures. For example, the O-ring 15 can be formed integrally with the inner surface of the fitting portion 4.

Figure 12:
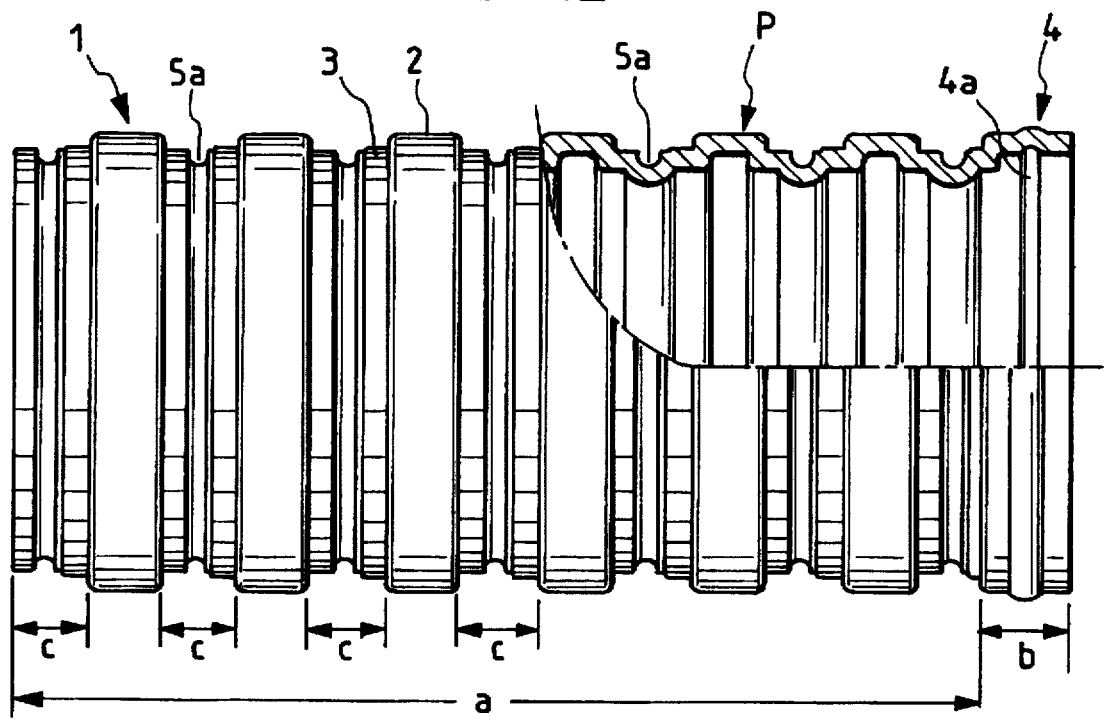
FIG. 12 is a partially cut-away front view of a pipe according to a fourth embodiment of the present invention.
Figure 13:
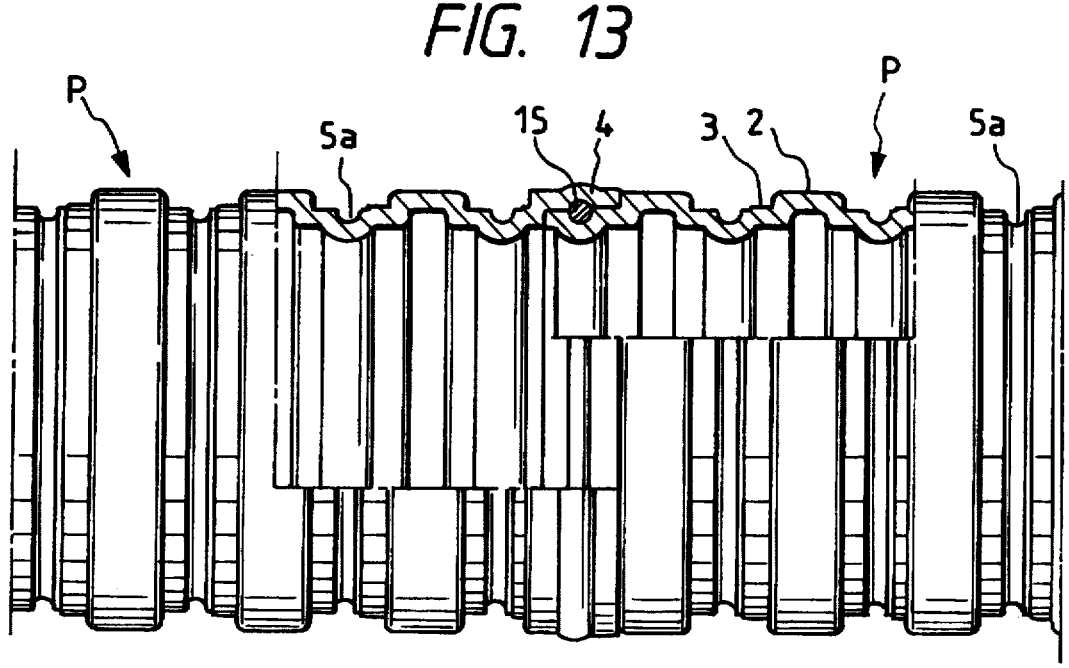
FIG. 13 is a partially cut-away front view of a connection portion of the pipe according to the present invention.

FIGS. 12 and 13 show the structure of a fourth embodiment of the invention, in which the pipe P is cut into a desired length as a concave portion 3 to thereby form a structure in which connection is made without a joint. A difference between the fourth embodiment and the previous embodiments is that the fourth embodiment has a cylindrical fitting pipe-like portion 4 with a re-entrant groove 4a which is continuously formed on one end portion b and each concave portion 3 in the pipe body portion a has a cylindrical shape c and a re-entrant groove 5a in its outer circumferential surface.

In the fourth embodiment, the cylinder c of the concave portion 3 can be used advantageously as an insertion connection portion for connection to the fitting pipe-like portion 4. An arbitrary length portion can be cut if the length is too large to connect the pipe P for the specific application. The connection method for this embodiment is the same as that of the third embodiment and, for brevity, the description thereof will be omitted.

Figure 14:
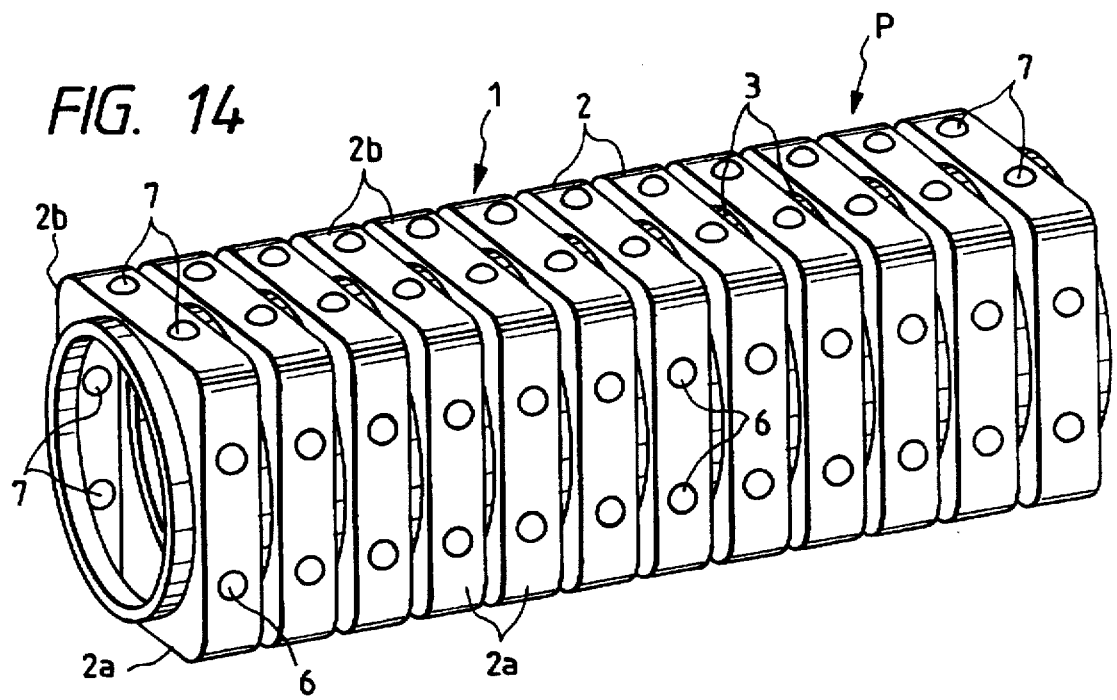
FIG. 14 is a perspective view of a pipe according to a fifth embodiment of the present invention.
Figure 15:
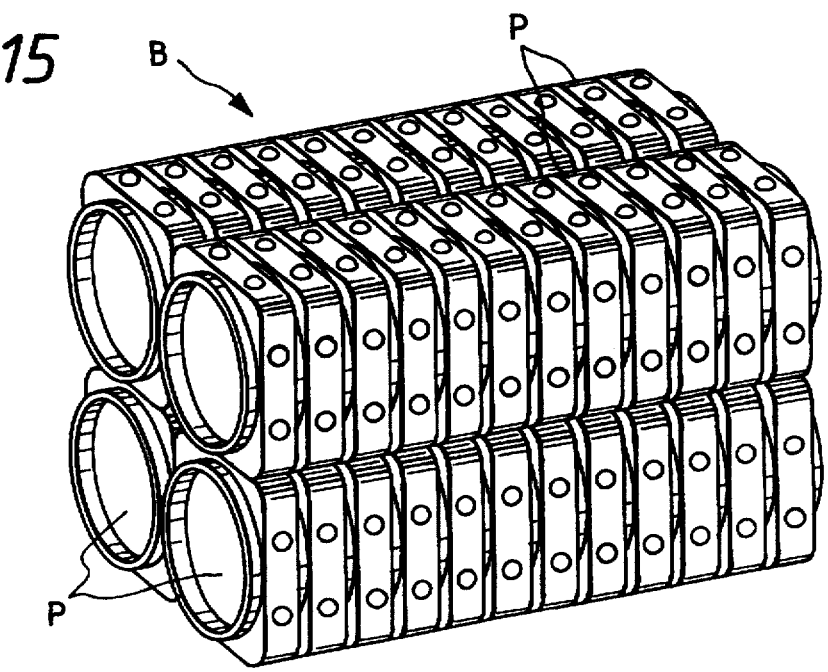
FIG. 15 is a perspective view illustrating a bundling of pipes according to the present invention.

FIG. 14 illustrates a fifth embodiment having a pipe structure suitable for close arrangement of a large number of pipes, such as a multi-pipe line B shown in FIG. 15. The pipe P is configured so that suitably sized projections 6 are formed on the outer circumferential surfaces of two sides 2a (e.g., front side and lower side in FIG. 14) of the convex portions 2 in the pipe P. The size of the projections is advantageously selected by the designer depending on the desired ease of connection (e.g., in which ease shorter connections would be employed) and the desired rigidity (e.g., in which ease longer connections would be employed) of the pipeline. Cavities 7 which receive the projections 6 are formed on upper side and back side 2b in FIG. 14. Alternatively, in FIG. 14, the surfaces where projections 6 and cavities 7 are formed may be selected to be a combination of the front and back surfaces or any other logical combination of the upper and lower surfaces, respectively.

The number of cavities 7 and projections 6 will vary depending upon the specific application. When two (or an even number 01) projections 6 or cavities 7 are formed on any one surface as shown in FIG. 14, one of the two structures may be formed as a projection 6 and the other may be formed as a cavity 7. In short, as shown in FIG. 15, projections and cavities are formed suitably so as to be fitted together when pipes P are arranged in a bundle.

Depending upon the designer's requirements and constraints, projections 6 and cavities 7 need not be formed on all sides of a convex portion 2. For example, projections 6 and cavities 7 may be formed simply on the front and back surfaces, or upper and lower surfaces of the convex portion 2, or formed alternately on the convex portions 2.

Figure 16:
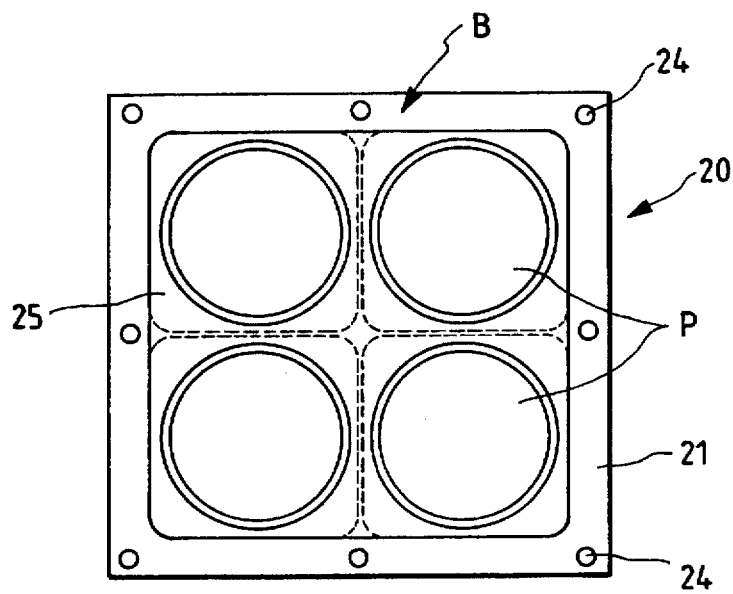
FIG. 16 is a side view of a connection portion of a bundled pipe line according to the present invention.
Figure 17:
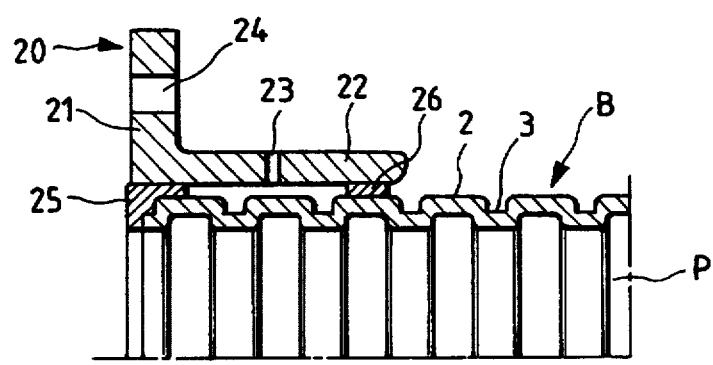
FIG. 17 is a longitudinal sectional view of a connection portion of a bundled pipe line according to the present invention.
Figure 18:
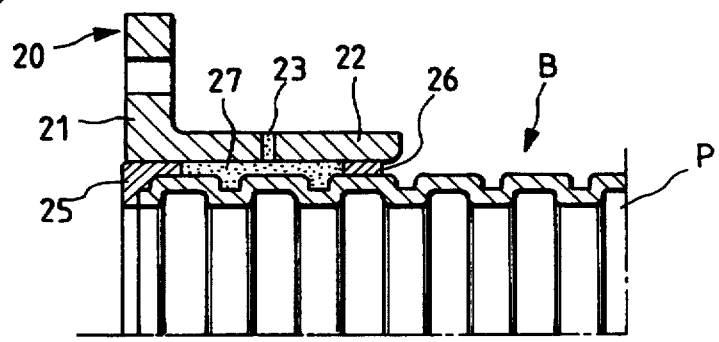
FIG. 18 is a longitudinal sectional view of the same portion of pipe according to the present invention as shown in FIG. 15.

To connect the bundled multi-pipe lines B, a rectangular packing 25 is pressed against an end surface of a multi-pipe line B, as shown in FIGS. 16 to 18. The rectangular packing 25 has a corresponding number of holes suitably sized to insert the concave portions 3 of the pipes thereinto. An annular packing 26 is fitted onto the outer circumferential surface of a convex portion 2 (or a concave portion 3) at a predetermined distance from the end surface of the multi-pipe line B. The end portions of the pipes are pressed into a pipe-like portion 22 of a rectangular pipe-like joint 20.

An adhesive hardening liquid 27 is advantageously injected into a space between the two packings 25 and 26 through a small hole 23 formed in the pipe-like portion 22 of the joint, so that the space is filled with the adhesive hardening liquid 27. Such adhesive hardening liquids are well-known and commonly available to ordinarily skilled artisans. The multi-pipe lines B formed as described above are positioned flat against each other.

The flat portions of two rectangular pipe-like joints 20 are coupled together to form a connection. The flanges 21 opposing each other are tightened and connected by using fasteners through the holes 24 formed in the flanges 21. Although description is omitted herein, it will be understood by the ordinarily skilled artisan that multi-pipe lines may be connected by any of a variety of other suitable means.

The hardness of a synthetic resin material for forming the pipe used in the present invention may be selected according to a number of considerations such as the size of the pipe to be produced, the area where the pipe will be used, and the like. For an underground pipe, a material having a relatively high hardness and high water resistance is preferably selected, so as to prevent pressure flattening, and taking into account the external pressure acting on the pipe wall 1.

Although preferred embodiments of the present invention have been described above, it will be understood by the ordinarily skilled artisan that the present invention is not limited to the structure shown in the foregoing embodiments and that changes may be made suitably without departing from the range of embodiments shown so long as the objects of the present invention are achieved. Thus, the invention can be practiced with modification within the spirit and scope of the appended claims.

As described above, according to the present invention, a pipe has a convex-concave shaped corrugated surface with convex portions having a quadrangular cross-sectional shape and concave portions having a circular cross-sectional shape. The pipe according to the present invention is advantageously shaped to prevent the pipe from undesirable shifting or movement. Furthermore, the concave portions of the inventive pipe allow a wire or cable to be inserted into the pipe with minimal resistance.

Also, the pipe according to the present invention is easily formed into multi-pipe lines because the convex portions are positionable flat against one another. Since such a multi-pipe line has little space between the individual pipes, the multi-pipe line prevents dirt and sand from accumulating between individual pipes. This feature is particularly useful when pipes are buried underground, and helps maintain the parallel, bundled configuration of the pipes and minimize disturbance of the linear and parallel alignment of the lines within the pipe. Therefore, the pipe according to the present invention is highly suitable as an underground pipe, and further is produced economically and without increased cost.

Additionally, the pipe according to the invention has the same strength against being flattened by pressure as the conventional pipe, even though the pipe according to the present invention is formed only of synthetic resin.

Having thus described my invention, what is claimed as new and desire to secure by Letters Patent is as follows:

1. A synthetic resin corrugated pipe comprising:
    a corrugated pipe wall having one of an annular shape or a helical shape,
    said corrugated pipe wall having a plurality of a tubular convex portions having a quadrangular cross-sectional shape and a plurality of tubular concave portions having a circular cross-sectional shape, wherein said tubular convex portions are larger than said tubular concave portions.

2. A synthetic resin corrugated pipe comprising:
    a corrugated pipe wall having one of an annular shape or helical shape,
    said corrugated pipe wall having a plurality of tubular convex portions having a quadrangular cross-sectional shape and a plurality of tubular concave portions having a circular cross-sectional shape,
    wherein said tubular convex portions are larger than said tubular concave portions,
    wherein each of said convex portions has a square cross-section shape with arc-shaped corners.

3. A synthetic resin corrugated pipe according to claim 1, wherein said convex portions include a plurality of projections and a plurality of cavities for receiving said projections, formed on outer circumferential surfaces of said convex portions.

4. A synthetic resin corrugated pipe, comprising:
    a corrugated pipe wall having one of an annular shape or helical shape,
    said corrugated pipe wall having a plurality of tubular convex portions having a quadrangular cross-sectional shape and a plurality of tubular concave portions having a circular cross-sectional shape,
    wherein said tubular convex portions are larger than said tubular concave portions,
    wherein a first end of said pipe includes a quadrangular fitting portion having an internal dimension substantially similar to that of an external dimension of said convex portions.

5. A synthetic resin corrugated pipe according to claim 4, wherein a second end of said pipe includes a male connection portion, said male connection portion including a male concave portion having a different external dimension than that of others of said convex portions.

6. A synthetic resin corrugated pipe according to claim 1, wherein a first end of said pipe includes a fitting portion having a cylindrical cross-sectional shape.

7. A synthetic resin corrugated pipe according to claim 6, wherein a second end of said pipe includes a male connection portion having a cylindrical cross-sectional shape,
    said male connection portion for being positioned in said fitting portion.

8. A synthetic resin corrugated pipe comprising:
    a corrugated pipe wall having one of an annular shape or helical shape,
    said corrugated pipe wall having a plurality of tubular convex portions having a quadrangular cross-sectional shape and a plurality of tubular concave portions having a circular cross-sectional shape,
    wherein said tubular convex portions are larger than said tubular concave portions,
    wherein a diameter of an outer surface of a cylindrical fitting portion is substantially equal to a length of a side of said quadrangular convex portion.

9. A synthetic resin corrugated pipe according to claim 7, wherein an inner surface of said male connection portion has a cylindrical cross-sectional shape and a diameter similar to a diameter of an inner surface of one of said concave portions.

10. A pipeline, comprising:
    at least one pipe, said at least one pipe including a pipe wall,
    wherein said pipe wall comprises a quadrangular outer surface and a recessed circular surface, said pipe wall being formed of synthetic resin, and
    wherein said quadrangular outer surface comprises quadrangular portions and said recessed circular surface comprises circular portions, said quadrangular portions and said circular portions alternating along a length of said at least one pipe.

11. A pipeline comprising:
    at least one pipe, said at least one pipe including a pipe wall,
    wherein said pipe wall comprises a quadrangular outer surface and a recessed circular surface, said pipe wall being formed of synthetic resin,
    wherein said quadrangular outer surface comprises quadrangular portions and said recessed circular surface comprises circular portions,
    said quadrangular portions and said circular portions alternating along a length of said at least one pipe,
    wherein said at least one pipe includes first and second pipes, said pipeline further comprising a joint for joining said first and second pipes,
    said joint including a plurality of joining packings, a sealing packing forming a seal between said sections of said first and second pipes and a joint cover,
    said joining packings having an outer surface having a first size and shape and an inner surface having a second size and shape, and said circular portions including an exterior having said second size and shape.

12. A pipeline as in claim 11, wherein said quadrangular portions have an exterior having a third size and shape larger than said first size and shape, and said joint cover includes ridges for accommodating said packings.

13. A pipeline comprising:

at least one pipe, said at least one pipe including a pipe wall, wherein said pipe wall comprises a quadrangular outer surface and a recessed circular surface, said pipe wall being formed of synthetic resin, wherein said quadrangular outer surface comprises quadrangular portions and said recessed circular surface comprises circular portions, said quadrangular portions and said circular portions alternating along a length of said at least one pipe, wherein said at least one pipe includes first and second pipes, said pipeline further comprising a joint for joining said first and second pipes, said joint including a plurality of joining packings, a plurality of sealing packings forming a seal between said sections of said first and second pipes, a plurality of pins and a joint cover, said joining packings having a channel cross-sectional shape, and being positioned between said joint cover and said quadrangular portions, said joint cover having a groove and pin holes, said sealing packings being positioned between said sections of said pipe and said groove, and said pins being positioned in said pin holes for fixedly securing said joint cover.

14. A pipeline comprising:

at least one pipe, said at least one pipe including a pipe wall, wherein said pipe wall comprises a quadrangular outer surface and a recessed circular surface, said pipe wall being formed of synthetic resin, wherein said quadrangular outer surface comprises quadrangular portions and said recessed circular surface comprises circular portions, said quadrangular portions and said circular portions alternating along a length of said at least one pipe, wherein said at least one pipe includes a first end having a fitting portion, said fitting portion having a groove.

15. A pipeline as in claim 14, wherein said fitting portion includes an inner surface, said inner surface having substantially a same size and shape as an outer surface of said quadrangular portions.

16. A pipeline as in claim 10, wherein said at least one pipe includes a first end and a second end opposite said first end, said first end including a fitting portion and said second end including an inserting portion, said fitting portion including an inner surface having substantially a same size and shape as that of an outer surface of said inserting portion.

17. A pipeline comprising:

at least one pipe, said at least one pipe including a pipe wall, wherein said pipe wall comprises a quadrangular outer surface and a recessed circular surface, said pipe wall being formed of synthetic resin, wherein said quadrangular outer surface comprises quadrangular portions and said recessed circular surface comprises circular portions, said quadrangular portions and said circular portions alternating along a length of said at least one pipe, wherein said circular portions have an exterior groove.

18. A pipeline as in claim 10, wherein said quadrangular portions have an exterior surface including at least one projection and at least one cavity.

19. A multi-pipe system, comprising:

a plurality of synthetic resin pipes each having a quadrangular outer surface and a circular inner surface forming a pipe bundle, wherein said quadrangular outer surface comprises quadrangular portions and said circular inner surface comprises circular portions, said quadrangular portions and said circular portions alternating along a length of each of said pipes; and a joint for joining a first pipe bundle with a second pipe bundle.

20. A synthetic resin corrugated pipe as in claim 1, wherein said tubular convex portions have a quadrangular hollow portion.

21. A pipeline as in claim 10, wherein said quadrangular portions have a quadrangular hollow portion.

22. A synthetic resin corrugated pipe as in claim 1, wherein the width of each of said convex portions in the lengthwise direction of the pipe is longer than that of each of said concave portions.

23. A pipeline as in claim 10, wherein the width of each of said quadrangular portions in the lengthwise direction of the pipe is longer than that of each of said circular portions.

24. A synthetic resin corrugated pipe as in claim 1 wherein each of said convex portions has a hollow portion larger in size than a hollow portion of said concave portions.

25. A pipeline as in claim 10, wherein each of said quadrangular portions has a hollow portion larger in size than a hollow portion of said circular portions.

* * * * *